Aug. 27, 1968  TOKUSHICHI OMOTO ET AL  3,399,098

METHOD FOR PRODUCTION OF FOAMED POLYETHYLENE

Filed Oct. 12, 1964  3 Sheets-Sheet 1

INVENTORS.
TOKUSHICHI OMOTO; MICHIO UCHIDA; TAKESHI OGATA; YOSHIYA FUKAKUSA;
TERUO SAITO; KOSHIRO SAITO; SHOZO IMOTO; KISHIZU YOKOYAMA:
KEIZO KATAGIRI.

BY

ATTORNEY

Aug. 27, 1968   TOKUSHICHI OMOTO ET AL   3,399,098
METHOD FOR PRODUCTION OF FOAMED POLYETHYLENE
Filed Oct. 12, 1964                                      3 Sheets-Sheet 3
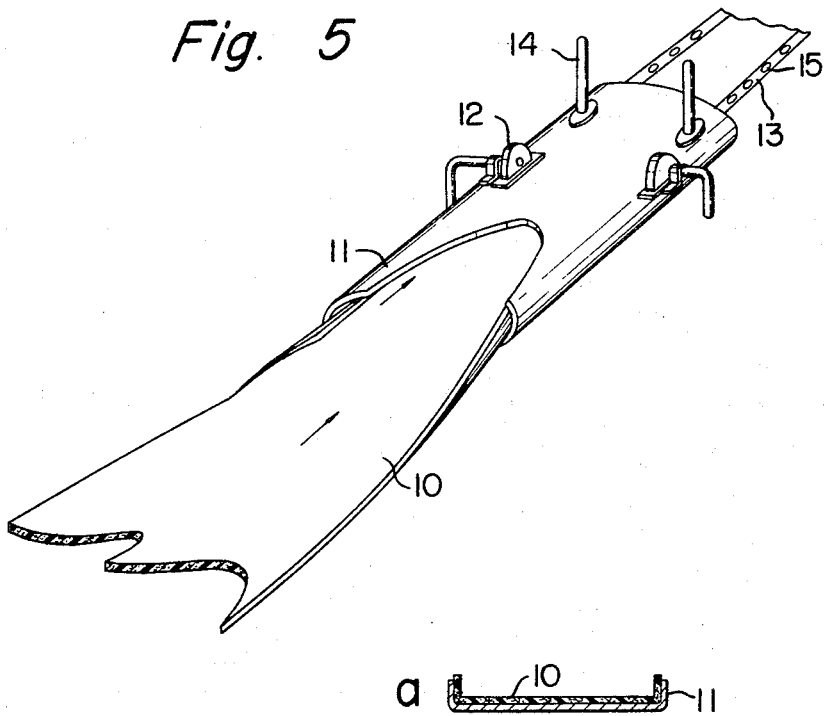
Fig. 5
a 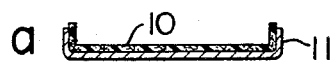
Fig. 6   b 
c 
d 
e 
f
INVENTOR
TOKUSHICHI OMOTO; MICHIO UCHIDA; TAKESHI OGATA; YOSHIYA FUKAKUSA;
TERUO SAITO; KOSHIRO SAITO; SHOZO IMOTO; KISHIZU YOKOYAMA;
KEIZO KATAGIRI;
BY
ATTORNEY

United States Patent Office 3,399,098
Patented Aug. 27, 1968

3,399,098
METHOD FOR PRODUCTION OF FOAMED POLYETHYLENE
Tokushichi Omoto, Tokyo, Michio Uchida, Yokohama, Takeshi Ogata, Yoshiya Fukakusa, Teruo Saito, Koshiro Saito, and Shozo Imoto, Tokyo, Kishizu Yokoyama, Kawasaki, and Ketzo Katagiri, Tokyo, Japan, assignors to Nippon Kakoh Seishi K.K., Tokyo, Japan
Filed Oct. 12, 1964, Ser. No. 403,091
Claims priority, application Japan, Oct. 17, 1963, 38/54,836
3 Claims. (Cl. 156—200)

ABSTRACT OF THE DISCLOSURE

Method for making a foamed polyethylene using an aliphatic hydrocarbon, azobisisobutyronitrile and a $CO_2$ producing material as foaming agents. The foamed polyethylene can be bonded to cloth or paper to make a leather like sheet.

---

Figure 1:
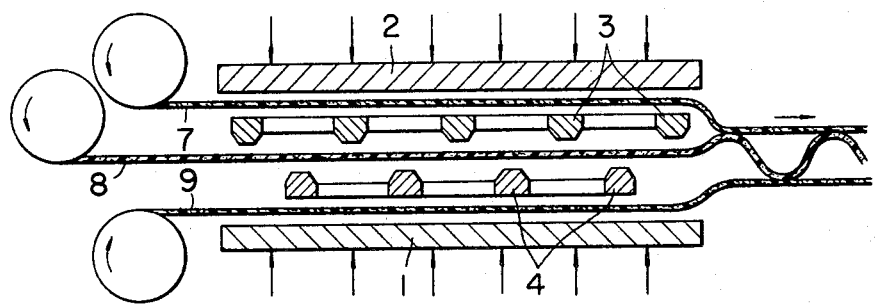

This invention relates to a method for the production of foamed polyethylene. More particularly, this invention relates to a novel method capable of producing foamed polyethylene, which has uniform and fine foams and which is excellent in whiteness, luster, opacity, strength, etc., with high efficiency by using an extruder with circular die or T-die, a blow molder, an injection molder and the like, as is, that has hitherto been in use for the extrusion-molding of thermoplastic resin.

This invention also relates to a method for producing a heat insulating structure by molding under heat and pressure the above mentioned polyethylene.

Further, this invention relates to a method for the production of an artificial leathery article made of said extruded foamed polyethylene bonded to the base cloth or resin-impregnated paper under heating and pressure and simultaneously embossed.

Further, this invention relates to a method for the production of a corrugated structure made by corrugating said extruded foamed polyethylene, said structure having higher buffering and heat insulation effects.

Further this invention relates to the incorporation of subliming materials, such as insecticide, bactericide, anti-corrosive or aromatic, etc., in the foamed resinous body at the time of forming the foamed polyethylene and bonding a filmy substance closely to one or both surfaces thereof, thereby preventing or limiting the diffusion of said mixed element.

Further, this invention relates to a method for the production of a heat-retaining sheet for agriculture made by heat-sealing, while folding back, both ends of the sheet-like article produced in the way mentioned above, thereby forming a reinforced edge part at said both ends, and thereafter cutting eyelets at predetermined intervals in said edge part.

That is to say, according to this invention, it is possible to produce expandable polyethylene for use in making sheet-like articles or blow moldings, etc. by impregnating polyethylene with an aliphatic hydrocarbon liquid (or gas) having a boiling point of 30–70° C. as a foaming agent, adding thereto azobisisobutyronitrile in fine-particle form having neither miscibility nor reactivity with the polyethylene, and extruding on molding the resulting mixture continuously at a temperature over the softening point of polyethylene resin by using an extruder with circular die or T-die and molders. At this time, the polyethylene beads may be either granular, spherical or fragmental in shape, but, when the permeability, diffusibility and storageability of the foaming agent, the uniformity of the amount to be extruded at the time of extrusion, the uniformity of the fine foams in a product, etc. are taken into consideration, the use of beads having a size of 4–10 mesh are preferable to give good results.

Also, the amount of foaming agent suitable for generating uniform foams at the time of extrusion is 3–15% to the polyethylene resin.

In this invention, foamed polyethylene having a density of 0.3–0.5 g./cm.$^3$ is obtained by impregnating polyethylene with a foaming agent for example, aliphatic hydrocarbon, in liquid and/or gaseous phase for 48–72 hours at normal temperature and under normal pressure, thereafter diffusing the foaming agent present in the surface of the polyethylene resin, adding azobisisobutyronitrile further thereto and extruding the resulting mixture by using an extruder.

Incidentally, in this invention, in order to adjust the density to 0.3–0.5 g./cm.$^3$ and thereby give better opacity and whiteness, aluminium carbonate, titanium dioxide, clay, magnesium sulfate, diatomaceous earth, etc. having a diameter of about 0.01–5$\mu$ are mixed and used as the substance in fine-particle form which has neither miscibility nor reactivity with the polyethylene resin, yet which presents a solid form at the extrusion or molding temperature.

In addition to the above, in this invention, it is possible to make the foams uniform, yet to increase the whiteness and softness, by adding a foaming assistant which generates carbonic acid gas and water. In that case, if an organic acid such as citric acid, etc., and sodium bicarbonate as an inorganic acid are mixed, each in an amount of 0.1–0.5%, with said foaming assistant, it is more suitable for accomplishing the desired object.

Also, according to this invention, a manufactured article, which differs in visual and tactile impressions from conventional artificial leather of vinylchloride base, which, in particular, does not have any special addition product mixed therein, which is free from effects due to changes of the seasons upon the cold-resistance and heat-retaining property, which is of low density, which has elasticity and softness, which is excellent in the chemical resistance and electric insulation and which has high mechanical strength, is obtained by bonding the foamed polyethylene sheet produced in the way mentioned above to the base material used for conventional artificial leather, such as, for example, woven cloth, knitted cloth, paper and their natural or synthetic resin-processed articles, non-woven article, various kinds of resin films, etc. by a publicly-known method.

The point that the manufactured article, artificial leather, of the type mentioned above which does not have any addition product mixed therein and which is stable for changes of the seasons, that is, does not vary for the rising and lowering of temperature, is obtained is a surprising matter. In conventional artificial leather, there appear defects such that, because of the thermal conductivity being high and the specilc heat being low, the leather becomes very cold and rigid at a low temperature, and, at a high temperature, the surface thereof becomes extremely high in temperature, with the result that it does not feel like leather. However, in the artificial leather produced by using a soft foamed resin sheet, particularly a sheet made by using foamed polyethylene resin, the thermal conductivity lowers, for example, the thermal conductivity of leather made of polyvinyl chloride is 0.145 kcal./m.$^{-1}$/hr.$^{-1}$/deg.$^{-1}$, whereas that of the artificial leather obtained by this invention is 0.068 kcal./m.$^{-1}$/hr.$^{-1}$/deg.$^{-1}$, and the specific heat is extremely high thereby eliminating the defects mentioned above.

The results so far obtained by the present inventor show that, in using this soft foamed olefin resin sheet, the use of a sheet having a density of 0.1–0.6 g./cm.³ results in producing a good manufactured article which possesses the above said characteristics.

The polyethylene resin hitherto used is taken to be difficult to bond to the base material for artificial leather, for example, not only the materials mentioned above, but, also, other materials in general, but it is possible to obtain fully satisfactory results by bonding a foamed polyethylene sheet to said base material even by such publicly-known bonding methods as are mentioned below.

One method comprises the steps of heating the surface of the base material, for example, fibrous cloth, to be bonded to the foamed polyethylene sheet having a density of 0.1–0.6 g./cm.³ produced by the high pressure method to 100–130° C. by infrared rays, hot air, etc., immediately thereafter placing said foamed polyethylene sheet on said base material and bonding them together under a pressure of 2–6 kg./cm.² by press rolls or embossing rolls, thereby obtaining artificial leather having sufficient bonding strength.

Incidentally, in order to maintain the density and elasticity of the artificial leather so obtained, that is, to insure that the foams therein are not squeezed out of shape, the use of sharply engraved rolls is more preferable. Also, it is apt to be thought that the density of the foamed polyethylene sheet becomes extremely high through the bonding of said sheet under pressure, but it has been confirmed that this defect can be offset, thereby giving the above-mentioned characteristics, by the fact that the foaming assistant, etc. added at the time of producing said sheet foams again at the time of bonding said substance and the base material together under heating.

Another method comprises the steps of placing the foamed polyethylene sheet on the base material, sending them to the heating section for heating by the above-mentioned method or a corresponding method for as short a period of time as possible at a temperature of 100–130° C. at the upper or the lower part thereof with or without adhesives and immediately thereafter pressing them by rolls and taking them off by winding, thereby obtaining the same artificial leather as that obtained by the above-mentioned method.

Another bonding method is subjecting the surface of said sheet to oxidation treatment for 20–50 seconds with 5400–9000 v. by an ozonizer, thereby making the bonding more easy as compared with the above-mentioned method, or applying a starch derivative as adhesives to said treated surface and/or a pressure-sensitive bonding agent of synthetic resin or synthetic rubber thinly to the base material and bonding them together, thereby obtaining the object manufactured article having sufficient bonding strength.

In producing the foamed polyethylene sheet which is used in this invention by the high pressure method, it is also possible to produce a foamed polyethylene sheet of white or other optional colors by mixing an optically inactive inorganic pigment of white color having high hiding power or the same type pigments of other colors, and, therefore, artificial leather of the desired color can be produced simply by using such a colored sheet.

The manufactured article obtained in this way can be used easily in all fields in which conventional artificial leather or converted paper is applied, such as wall-paper and linings for structures, automobiles, airplanes, etc., general book covers and similar usages, various kinds of materials for upholstering chairs and table-covers, carpets, footgear such as slippers, etc., bands for wrist watches and belts for clothing, tape backing, bags and pouches of all kinds, tents for field use and covers for automobiles and other machines and equipments, and so forth.

Also, in this invention, a sublime element, such as insecticide, bactericide, anticorrosive or aromatic, etc., is mixed in the foamed resinous body, which is then molded into a sheet-like or other appropriate shapes and a filmy substance is bonded closely to one or two surfaces thereof, the sublime element being mixed in an appropriate amount at the time of producing said foamed resinous body, and the closely-bonded filmy substance preventing or limiting the diffusion of said sublime element, thereby making the product suitable for the use purpose thereof. The sublime element contained in the foamed resinous body is moved to and diffused in the surface by the foams in the resinous body more easily than in the case of a foamless resinous body, so that, in practice, an appropriate amount of the sublime element is diffused in the desired direction by adjusting the subliming velocity, selecting the filmy substance of suitable quality according to the use purpose and carrying out the bonding thereof to one or two surfaces of said resinous body, thereby making the product capable of demonstrating the effect derived from the evaporation of the insecticide, bactericide, anticorrosive or aromatic, etc. according to the sublime element, and, therefore, the practical value thereof is extremely great.

Figure 3:
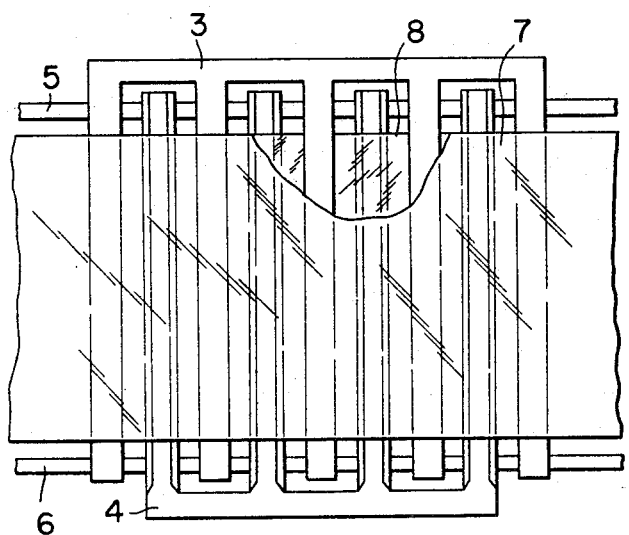

Next, when a corrugated cardboard structure is produced in this invention, as shown in FIG. 1, three sheet-like articles 7, 8, 9 are set, and the male comb element 3 and female comb element 4 shown in FIG. 3 are pushed in between the sheets from both sides, the forward end of the female comb element 4 being fastened to the fixed support stand 5, 6.

Figure 2:
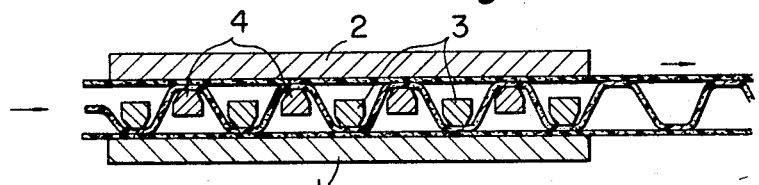

The lower metal plate 1 is then pushed upwardly until it has come into contact with the base of the female comb element 4, and, thereafter, the upper metal plates 2 are pressed in the order mentioned to form a wavy body of the intermediate sheet as shown in FIG. 2.

At this time, pressure is not specially required, it being possible to effect the heat-fusion bonding with copression by the weight alone of the metal plates. Also, the male comb element 3 and female comb element 4 shown in FIG. 2 must be spaced more than 1 mm. from the sheet at the opposite side with which they are in contact, and, in that state, they move the predetermined distance in the arrow-marked direction, during which time the sheets are fused by heat and bonded. And, the velocity at this time differs depending upon the kind and thickness of the sheet to be used, the time of bonding, etc.

Figure 4:
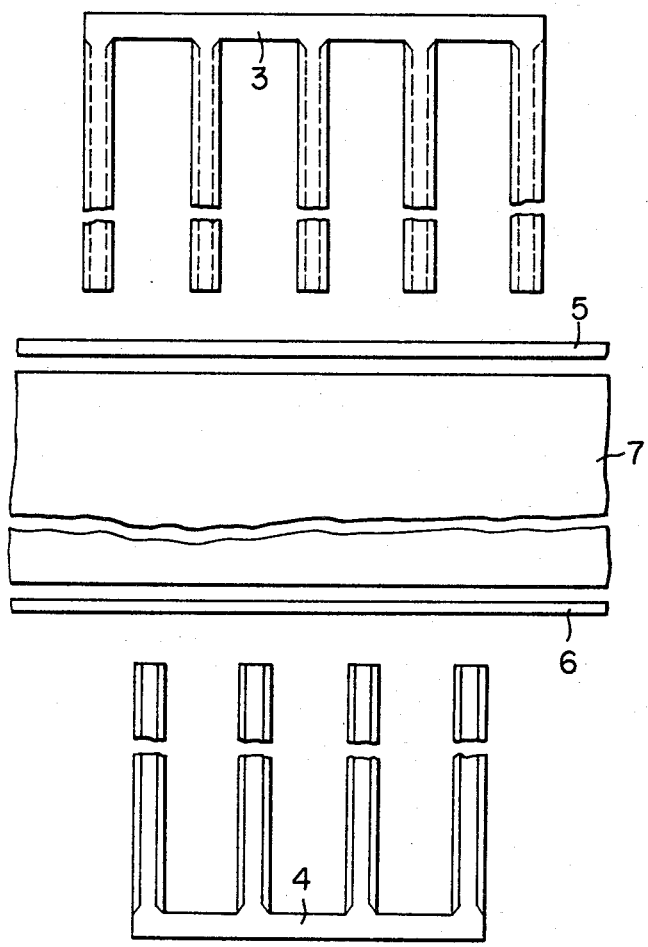

After the male comb element 3 and female comb element 4 stop moving and the metal plates 1 are returned to the original position, and, as shown in FIGURE 4, the male comb element 3 and female comb element 4 are drawn out, moving to the original position, and then set again as in FIG. 1, followed by the same processes, thereby making it possible to produce a corrugated cardboard structure continuously.

Also, if the male comb element 3 and female comb element 4 are used in two or more sets, the production can be carried out at high speed and continuously, and, also, it is possible, by changing the shape of the comb, to change in many ways the shape, too, of the liner shown in FIG. 2.

The characteristic features of this method of production are that the bonding by the bonding agent or starch, etc. hitherto widely used in conventional corrugated cardboard-producing methods is taken place of by the heat-fusion bonding and, therefore, this method is economical, that this method does not require the sizing and heating processes, and that the machine takes little space for installation.

Example 1

Polyethylene beads having a density of 0.92 was put in a vessel (for example, autoclave), followed by the addition of almost the same amount of petroleum ether, and the vessel was hermetically sealed. After 48–72 hours, the mixture in the vessel was taken out, then mixed with the following foaming assistant composition together with other bulking agents, etc., and, thereafter, the mixture was extruded continuously by an extruder with circular die (40 mm. φ).

| | Parts |
|---|---|
| Expandable polyethylene | [1] 100 |
| Azobisisobutyronitrile crystal | 0.1 |
| Citric acid | 0.1 |
| Sodium bicarbonate | 0.2 |
| Titanium dioxide | 0.05 |

[1] Amount impregnated, 6%.

The temperature condition was 110–170° C., at which the mixture was inflation-extruded by the circular die to obtain a foamed polyethylene sheet having a density of 0.35 g./cm.$^3$, a foam size of 0.2 mm. and a thickness of 0.5 mm., the foams being uniform and fine, said sheet being most excellent in whiteness and being excellent even in opacity.

Example 2

| | Parts |
|---|---|
| Expandable polyethylene | [1] 100 |
| Azobisisobutyronitrile crystal | 0.1 |
| Citric acid | 0.2 |
| Sodium bicarbonate | 0.4 |

[1] Amount impregnated, 7%.

A mixture of the above composition was continuously extruded by the same extruder as that in Example 1 to obtain a foamed polyethylene sheet having a density of 0.36 g./cm.$^3$, said sheet being excellent in opacity and luster, but being somewhat rough, as compared with that obtained in Example 1.

For comparison purposes, a mixture of the following composition

| | Parts |
|---|---|
| Expandable polyethylene | [1] 100 |
| Citric acid | 0.20 |
| Sodium bicarbonate | 0.40 |
| Titanium dioxide | 0.05 |

[1] Amount impregnated, 7%.

was extruded by the same extruder as that in Example 1 to obtain a foamed polyethylene sheet which was stiffer and stronger than that in Example 1, but the size of foams was not uniform and the opacity as well as the whiteness and smoothness of which were low, said sheet having a density of 0.57 g./cm.$^3$.

Example 3

| | Parts |
|---|---|
| Expandable polyethylene | [1] 100 |
| Azobisisobutyronitrile crystal | 0.10 |
| Titanium dioxide | 0.05 |

[1] Amount impregnated, 7%.

The foamed polyethylene sheet obtained had a density of 0.35 g./cm.$^3$, was excellent in whiteness and also excellent in luster and opacity, but was somewhat rough and stiff as compared with that obtained in Example 1.

| | Parts |
|---|---|
| Expandable polyethylene | 100 |
| Azobisisobutyronitrile crystal | 0.10 |
| Citric acid | 0.10 |
| Sodium bicarbonate | 0.20 |
| Titanium dioxide | 0.05 |

The azobisisobutyronitrile crystal is better than the powder as a foaming agent, but the two are one and the same as a component. As a result of experiment, the foamed polyethylene here obtained was inferior in smoothness as compared with that obtained in Example 1, the foams thereof not being uniform and the density being 0.32 g./cm.$^3$.

| | Parts |
|---|---|
| Polyethylene | 100 |
| Azobisisobutyronitrile crystal | 1 |
| Titanium dioxide | 0.05 |

When a mixture of the above composition was continuously extruded by a 40 mm. φ extruder, smooth foamed polyethylene with fine foams was obtained at the beginning, but, as the extrusion progressed, an offensive odor of the azobisisobutyronitrile crystal was generated, the molten substance scattered and the amount to be extruded became extremely small; thus, said mixture proved to be unusable for continuous operation.

The results in the preceding Examples 1–3 are those obtained by using a 40 mm. φ extruder and an inflation die, but, in the extrusion, too, by a T-die, the same results were obtained. Also, in all cases, extrusion was carried out at a temperature in the range of 110–170° C.

Example 4

| | Parts |
|---|---|
| Expandable polyethylene | [1] 100 |
| Azobisisobutyronitrile crystal | 0.05 |
| Citric acid | 0.1 |
| Sodium bicarbonate | 0.2 |
| Titanium dioxide | 0.05 |

[1] Amount impregnated, 5%.

With a mixture of the above, composition blow moldings such as reagent bottles, large-sized bottles, etc. were produced alternately and continuously by a hollow molding machine, obtaining foamed polyethylene products of white color which were light in weight and high in luster and opacity with a density of 0.35 g./cm.$^3$.

Example 5

The foamed polyethylene sheet produced in Example 1 having a weight of 117.4 g./m.$^2$, a thickness of 0.46 mm. and a density of 0.26 g./cm.$^3$ was placed on the base material cotton cloth, the two being then heated by irradiating infrared rays at 110° C. from the upper sheet, thereafter pressed by carving rolls under a pressure of 4.5 kg./cm.$^2$, and thereby bonded together at a rolling-out velocity of 5.5 m./min. This manufactured article had the following properties:

| | |
|---|---|
| Density of the foamed polyethylene sheet after pressing and bonding _____g./cm.$^3$__ | 0.24 |
| Density of the same artificial leather ____g./cm.$^3$__ | 0.38 |
| Tensile strength: | |
| Machine direction _____kg./15 mm__ | 27.0 |
| Cross machine direction _____kg./15 mm__ | 20.0 |
| Elongation: | |
| Machine direction _____percent__ | 21.0 |
| Cross machine direction _____do____ | 27.4 |
| Peeling strength: | |
| Machine direction _____kg./50 mm__ | 4.1 |
| Cross machine direction _____kg./50 mm__ | 3.0 |

Example 6

In the same way as in Example 1, the same sheet as that in Example 5 was placed on the base material kraft paper (weight, 46.8 g./m.$^2$ thickness, 0.15 mm.), the two being then heated by irradiating infrared rays up to 120° C., thereafter pressed by carving rolls under a pressure of 4.5 kg./cm.$^2$, and thereby bonded together at a rolling-out velocity of 4.5 m./min. This manufactured article had the following properties:

| | |
|---|---|
| Density of the manufactured article bonded after pressing _____g./cm.$^3$__ | 0.37 |
| Tensile strength: | |
| Machine direction _____kg./15 mm__ | 10.3 |
| Cross machine direction _____kg./15 mm__ | 7.1 |
| Elongation: | |
| Machine direction _____percent__ | 3.6 |
| Cross machine direction _____do____ | 12.5 |

The exfoliating strength was unmeasurable because of the base material kraft paper having been broken.

Example 7

The foamed polyethylene sheet produced in accordance with Example 1 having a weight of 120.0 g./m.$^2$, a thickness of 0.38 mm. and a density of 0.32 g./cm.$^3$ was placed on the base material fabric immediately after heating the latter to 115° C., the two being then pressed by carving rolls heated at 75° C. under a pressure of 5.5 kg./cm.$^2$ and thereby bonded together at a rolling-out velocity of 4.5 m./min. This manufactured article had the following properties:

Density of the foamed polyethylene sheet after
 pressing _____ g./cm.$^3$__ 0.39
Density of the same bonded manufactured article
 g./cm.$^3$__ 0.46
Tensile Strength:
 Machine direction _____ kg./15 mm__ 10.4
 Cross machine direction _____ kg./15 mm__ 4.9
Elongation:
 Machine direction _____ percent__ 10.0
 Cross machine direction _____ do____ 25.8
Exfoliating strength:
 Machine direction _____ kg./50 mm__ 1.7
 Cross machine direction _____ kg./50 mm__ 1.7

Example 8

The sheet obtained in accordance with Example 1, the surface of which had been subjected to oxidation treatment for 40 seconds with 7200 v. by an ozonizer, was bonded to kraft paper by applying starch of a starch derivative thinly to the latter by a brush. The exfoliating strength of this bonded substance was 3.3 kg./50 mm.

Example 9

The foamed polyethylene sheet 10 produced in accordance with Example 1 was advanced in the arrow-marked direction while the two ends thereof were being kept in contact with a curved guide element 11. The curved guide element 11, as is shown with sectional views in FIG. 6a, b, c, d and e, is so curved as to the extent that the degree of curving gradually increases at both ends and, finally, the inner upper part of the curved portion almost gets in parallel with the bottom surface as shown in f. The two ends of the foamed sheet 10 moving forwardly along the inner surface of this curved guide element 11 were bent in succession at the curved portion, as shown in FIGURE 5, the bent part becoming large gradually and, finally, being completely folded back into the state of f shown in the drawing. The part so folded back was then heat-sealed by a heat roller 12 to form a reinforced edge part 13, in which part an eyelet 15 was cut by a perforating tool 14, thus obtaining a heat-retaining sheet for agriculture and other fields having the reinforced edge part and the eyelet.

According to this invention, the thermoplastic synthetic resin foamed sheet drawn out from an extrusion-molding machine at the time of production thereof is forthwith guided to a curved guide element, the two side edges thereof being then bent and folded back, thereafter the part so folded back being heat-sealed to form a reinforced edge part and an eyelet being cut therein; therefore, the foamed sheet is, on the whole, reinforced and, also, the eyelet, too, is naturally reinforced because it is cut in the reinforced part, the sheet being very good in heat-retaining property as well as in durability, being less in damage to the eyelet and, therefore, being suitable for use as a heat-retaining sheet for agriculture and other fields.

And, the product is obtained continuously by a relatively simple apparatus; thus, the industrial effect of this invention is extremely great.

Example 10

The foamed polyethylene sheet produced in accordance with Example 1 having a weight of 200 g./m.$^2$ and a thickness of 360μ or 0.36 mm., and the pentagonal male comb element 3 and female comb element 4, 1 cm. in base length and 1 cm. in height, shown in FIG. 2 processed with silicon to prevent the adhering of molten thermoplastic resin, were used, the sheet being bondable through heat-fusion to form a corrugated cardboard structure with the temperature of the silicon-processed metal plates set at 150° C. and the pressing time set at 7 seconds. The pressure at this time was that of the weight alone of the metal plates.

Also, the conditions at the time the thermoplastic resin foamed sheet was used as an intermediate sheet of the three and the upper and the lower portions were bonded through heat-fusion to paper and cloth, respectively, were the same as those in the above-mentioned method, the bonding through heat-fusion being practicable with the pressing time 10 seconds.

Example 11

10 kg. of low density polyethylene beads was expandable with 3.5% of petroleum ether, followed by the addition of an assistant of the following composition and further perfume as a sublime element, and the mixture was extruded under the same conditions as those in Example 1 by an inflation extruder with circular die and/or molded to obtain a sheet which emits aroma for a short time.

COMPOSITION

Expandable polyethylene _____ 1,000
Azobisisobutyronitrile _____ 1
Sodium bicarbonate _____ 2
Citric acid _____ 1
Titanium dioxide _____ 0.5
Perfume (oriental flower) _____ 10

Example 12

The foamed polyethylene sheet produced in accordance with Example 1 was further heated for 15 seconds at a heating temperature of 150° C. by using a curved wooden mold having a draw ratio of 3:2 by the usual heat-molding machine, then pressed for 16 seconds under a pressure of 3 kg./cm.$^2$, cooled, thereafter taken out and molded to obtain a curved sheet which is foldable and, accordingly, convenient to carry about.

What is claimed is:
1. Method for the continuous production of a foamed polyethylene sheet which comprises the steps of,
 (a) adding to expandable polyethylene an aliphatic hydrocarbon having a boiling point of from 30–70° C.,
 (b) blending said hydrocarbon-polyethylene mixture with a minor amount of a mixture consisting of azobisisobutyronitrile, citric acid, sodium bicarbonate and titanium dioxide,
 (c) extruding said polyethylene mixture from step (b) at a temperature of from 110–170° C., whereby said polyethylene is expanded to obtain a foamed polyethylene sheet having a density of from 0.3–0.5 grams per cm.$^3$.
2. The method according to claim 1 wherein the said foamed polyethylene sheet is subsequently continuously bonded by the application of heat and pressure to a sheet selected from the group consisting of paper and cotton.
3. The method according to claim 1 wherein the edges of said foamed polyethylene sheet are progressively curved back upon the said polyethylene sheet and bonded by the application of heat and pressure to the body of said foamed polyethylene sheet to form a reinforced edge on said foamed polyethylene sheet and subsequently perforating said reinforced edge to form eyelets.

References Cited

UNITED STATES PATENTS 2,960,146  11/1960  Williams _____ 156—469 X (Other references on following page)

UNITED STATES PATENTS

| | | |
|---|---|---|
| 2,968,576 | 1/1961 | Keller et al. |
| 3,024,496 | 3/1962 | Colombo _____ 156—244 X |
| 3,094,449 | 6/1963 | Sisson _____ 264—53 X |
| 3,168,207 | 2/1965 | Noland et al. _____ 264—48 X |
| 3,227,605 | 1/1966 | Wolinake. |
| 3,069,367 | 12/1962 | Beaulieu et al. _____ 260—2.5 |
| 3,278,466 | 10/1966 | Cram et al. _____ 260—2.5 |

FOREIGN PATENTS

| | | |
|---|---|---|
| 629,822 | 10/1961 | Canada. |
| 638,083 | 1/1964 | Belgium. |
| 1,005,119 | 9/1965 | Great Britain. |

JAMES A. SEIDLECK, *Primary Examiner.*

P. E. ANDERSON, *Assistant Examiner.*